United States Patent
Biewer et al.

(10) Patent No.: US 7,802,400 B2
(45) Date of Patent: Sep. 28, 2010

(54) GUIDE RAIL FOR A SLIDING ROOF SYSTEM IN A MOTOR VEHICLE

(75) Inventors: Christian Biewer, Münster-Altheim (DE); Michael Jugl, Sulzbach (DE)

(73) Assignee: ArvinMeritor GmbH, Dietzenbach (DE)

( * ) Notice: Subject to any disclaimer, the term of this patent is extended or adjusted under 35 U.S.C. 154(b) by 1115 days.

(21) Appl. No.: 11/319,862

(22) Filed: Dec. 28, 2005

(65) Prior Publication Data

US 2006/0254147 A1 Nov. 16, 2006

(30) Foreign Application Priority Data

May 11, 2005 (DE) .................. 20 2005 007 475 U

(51) Int. Cl.
*E05D 15/10* (2006.01)
(52) U.S. Cl. .................................... 49/213; 296/216.08
(58) Field of Classification Search ............ 296/216.08; 49/213, 216; 16/358, 359, 361, 87 R
See application file for complete search history.

(56) References Cited

U.S. PATENT DOCUMENTS

| | | | | |
|---|---|---|---|---|
| 3,877,641 A * | 4/1975 | Plourde | ...................... | 238/234 |
| 4,223,834 A * | 9/1980 | Fechter | ...................... | 238/10 E |
| 4,277,888 A * | 7/1981 | Szabo | .......................... | 30/162 |
| 6,494,528 B2 * | 12/2002 | Tolinski et al. | .......... | 296/216.04 |
| 6,497,072 B2 * | 12/2002 | Fries | ........................... | 49/209 |
| 6,619,732 B2 | 9/2003 | Radmanic | | |
| 6,799,796 B2 * | 10/2004 | Radmanic | .............. | 296/216.08 |
| 6,857,694 B2 * | 2/2005 | Radmanic | .............. | 296/216.08 |
| 7,029,062 B2 * | 4/2006 | Deppe et al. | ........... | 296/216.08 |
| 7,073,851 B2 * | 7/2006 | Seifert | ................... | 296/216.08 |
| 7,255,392 B2 * | 8/2007 | Bendel et al. | .......... | 296/216.08 |
| 7,267,398 B2 * | 9/2007 | Van De Logt et al. | ... | 296/216.08 |
| 2002/0113467 A1 * | 8/2002 | Radmanic | .............. | 296/216.03 |
| 2002/0163228 A1 | 11/2002 | Wingen | | |
| 2003/0047968 A1 | 3/2003 | Imgram | | |
| 2003/0075956 A1 * | 4/2003 | Tamura et al. | ......... | 296/216.08 |
| 2003/0085594 A1 | 5/2003 | Engelgau | | |
| 2004/0032150 A1 | 2/2004 | Radmanic | | |
| 2004/0032151 A1 * | 2/2004 | Radmanic | .............. | 296/216.08 |
| 2004/0041443 A1 * | 3/2004 | Nabuurs | ................ | 296/216.08 |
| 2004/0123524 A1 * | 7/2004 | Batinli et al. | .................. | 49/216 |

FOREIGN PATENT DOCUMENTS

CN 2105513 U 5/1992

(Continued)

OTHER PUBLICATIONS

Used Machine translation of JP-5133157.*

(Continued)

*Primary Examiner*—Jerry Redman
(74) *Attorney, Agent, or Firm*—Carlson, Gaskey & Olds

(57) ABSTRACT

A guide rail for a sliding roof system in a motor vehicle includes a first rail element and a second rail element rigidly connected to the first rail element. A guide track extends without interruption over the first and second rail elements. The first and second rail elements include abutment edges that face each other. The abutment edges run in a generally straight line to form an acute angle relative to a longitudinal direction of the guide rail.

18 Claims, 4 Drawing Sheets

FOREIGN PATENT DOCUMENTS

| | | |
|---|---|---|
| DE | 100 46 068 | 4/2002 |
| EP | 1 223 065 | 7/2002 |
| EP | 1 291 216 | 3/2003 |
| EP | 1 389 545 | 2/2004 |
| GB | 818043 | 8/2009 |"
| JP | 05133157 A  *  5/1993 |

OTHER PUBLICATIONS

International Search Report Dated Nov. 10, 2006.

* cited by examiner a)

b)

c)

d)

GUIDE RAIL FOR A SLIDING ROOF SYSTEM IN A MOTOR VEHICLE

BACKGROUND OF THE INVENTION

The application claims priority to German Patent Application No. 20 2005 007 475.6, which was filed May 11, 2005.

The invention relates to a guide rail for a sliding roof system in a motor vehicle that includes a first rail element, a second rail element rigidly connected with the first rail element, and at least one guide track that extends without interruption over the first and the second rail elements. A sliding element of a sliding carriage is guided in the guide track, and is connected with a cover piece.

A guide rail 10', known from the prior art, is illustrated in FIG. 2. As shown, a guide track 16' which, when viewed in a longitudinal direction L of the guide rail 10', includes an initial section running obliquely upwards that serves to initially raise a cover piece 6'. The cover piece 6' is guided in the guide track 16' via a sliding carriage 20' with a sliding element 18' arranged thereon when the cover piece 6' is moved in the longitudinal direction of the vehicle. The guide track 16' is then configured to have a section substantially parallel to the longitudinal direction L of the guide rail (and hence of the vehicle). To make production simpler, this guide rail 10' is constructed in two parts by having a first rail element 12' in a region of the initial section running obliquely upwards, and a second rail element 14', directly adjoining the first rail element 12', in a region of the section that runs in a straight line and parallel to the longitudinal direction L of the guide rail.

One disadvantage with this configuration is that when the cover piece 6' is moved rearwardly, the sliding element has to travel over all abutment edges of an abutment point between the first rail element 12' and the second rail element 14' simultaneously, which results in an increased wearing of the sliding element and, in addition, an undesired noise generation.

The subject invention provides a guide rail for a sliding roof system in a motor vehicle that is distinguished by a smaller amount of wear, and hence a longer lifespan of the sliding element, and which also has a distinctly lower level of noise generation.

SUMMARY OF THE INVENTION

In accordance with the invention, a guide rail includes first and second rail elements. The first and second rail elements each have an abutment edge facing the other respective rail element in a region of connection. The abutment edge deviates from a vertical to a longitudinal direction of the guide rail, i.e. the abutment edges deviate from a line perpendicular to the longitudinal direction of the guide rail, at least in a region of a guide track. The abutment edges of the first and second rail elements are formed to be complementary to each other. A transition from the first rail element to the second rail element is therefore developed so that the abutment edge no longer runs perpendicularly to a direction of movement of a sliding element. For this reason, abutment points are traveled over by the sliding element in a chronologically staggered manner. In this way, both the wear of the sliding element, and also the noise development during opening of a sliding roof, are substantially reduced when compared with the prior art.

According to a preferred embodiment of the invention, the abutment edges run in a straight line and form an acute angle with the longitudinal direction of the guide rail. This development is distinguished not only by being able to be produced particularly simply, but also a geometric support of transition points takes place advantageously through an oblique cut of the first and second rail elements. Alternatively, the abutment edges may also have any other course that deviates from a course perpendicular to the guide rail.

The first rail element preferably is a material that is different from a material of the second rail element. For example, the second rail element may be a profile rail made of metal that is manufactured in a simple manner by extrusion. The metal is preferably aluminum.

A connection of the first and second rail elements, which is particularly simple to realize, is possible when the first rail element is a plug-in element made of plastic that is mounted onto the second rail element. The first rail element is then produced, for example, by injection molding.

The guide track may have a section extending obliquely upwards in a region of the first rail element, and may run continuously in a straight line and parallel to the longitudinal direction of the guide rail in a region of the second rail element. This development is particularly advantageous when, as already mentioned, the second rail element is a profile rail made of metal, because this can be produced without difficulty with a guide track which is continuously parallel and running in a straight line. The section of an oblique course of the guide track, which serves to raise the cover piece, is situated entirely in a region of the first rail element, which can be manufactured from plastic basically in any desired shape by injection molding. In this way, a guide rail is produced that is able to be manufactured particularly simply and at a favorable cost.

In one preferred embodiment, the first rail element has a contact surface running substantially in the longitudinal direction of the guide rail. The first rail element rests against the second rail element at the contact surface. The connection between the first and second rail elements thereby becomes very stable.

These and other features of the present invention can be best understood from the following specification and drawings, the following of which is a brief description.

DETAILED DESCRIPTION OF THE PREFERRED EMBODIMENT

Figure 1:
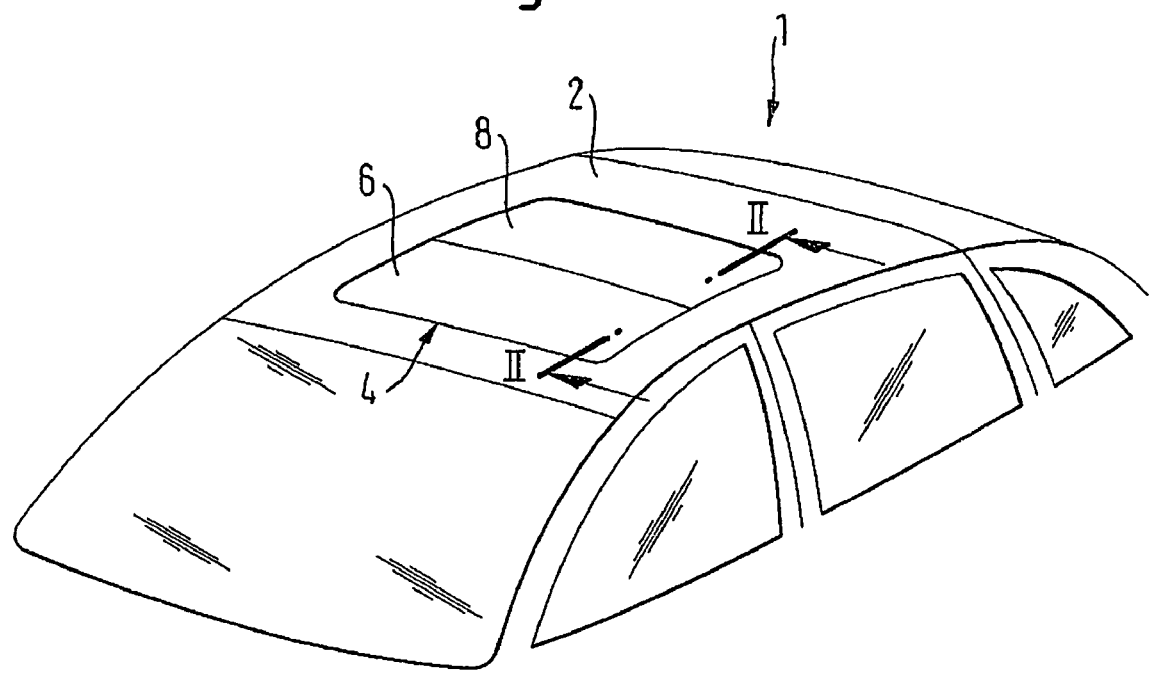
FIG. 1 shows a diagrammatic view of a vehicle roof with a sliding roof system.
Figure 2:
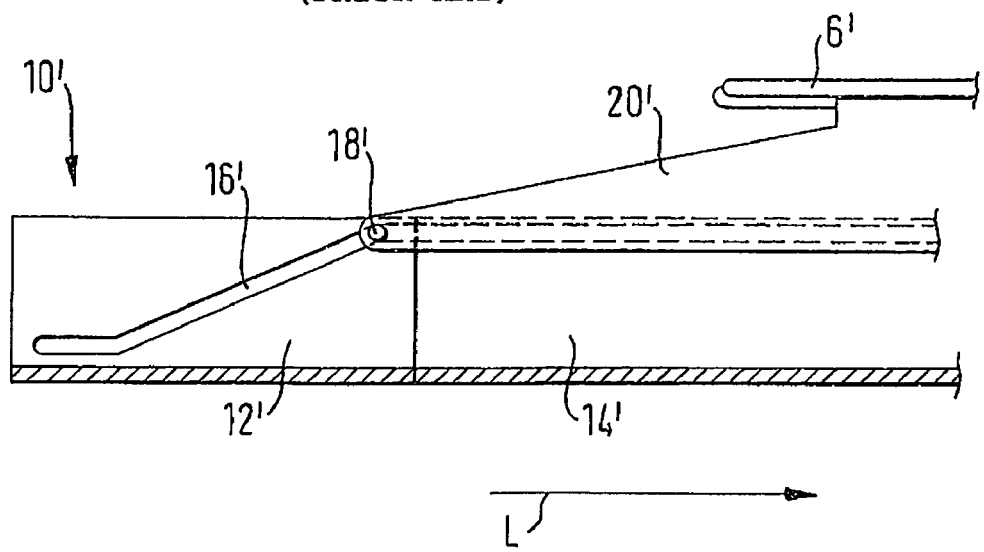
FIG. 2 shows a diagrammatic sectional view of a guide rail according to the prior art.

FIG. 1 shows diagrammatically a vehicle 1 with a vehicle roof 2. A sliding roof system 4 is arranged on the vehicle roof 2. The sliding roof system 4 has two cover pieces 6, 8, with at least one of the cover pieces 6, 8 being moveable. The sliding roof system 4 may also be a so-called "slide-and-lift" roof.

Figure 3:
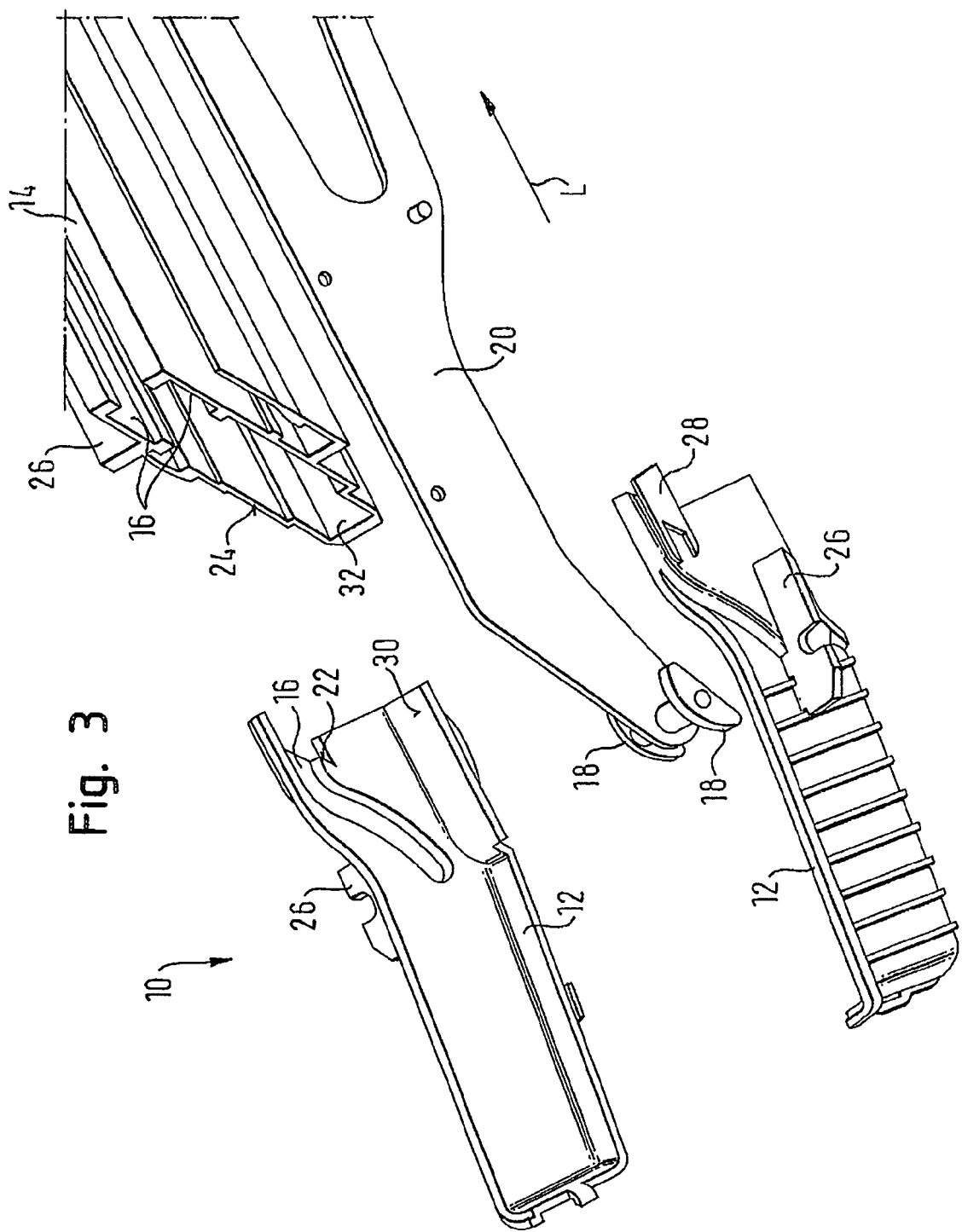
FIG. 3 shows an exploded view of a guide rail according to the invention.

FIG. 3 shows a guide rail 10 according to the invention, as is used in the sliding roof system 4 in accordance with FIG. 1. Two guide rails are usually provided that are mounted on the vehicle roof 2 on both sides of a roof opening.

Figure 5:
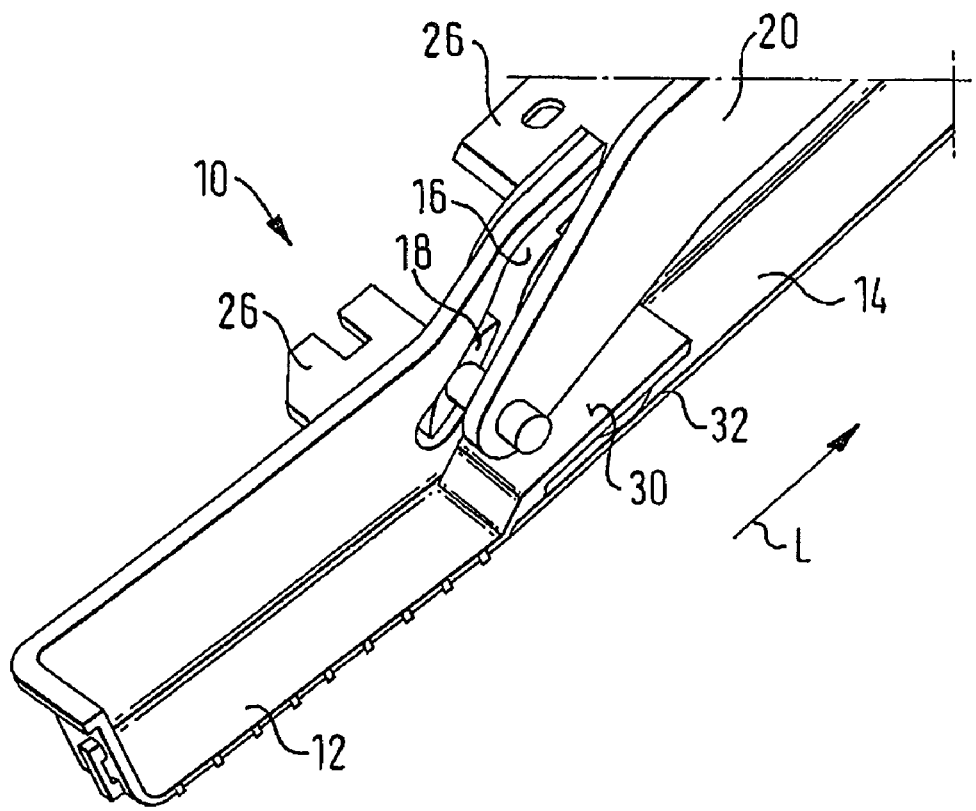
FIG. 5 shows a perspective sectional view of the guide rail of FIG. 4.
Figure 6:
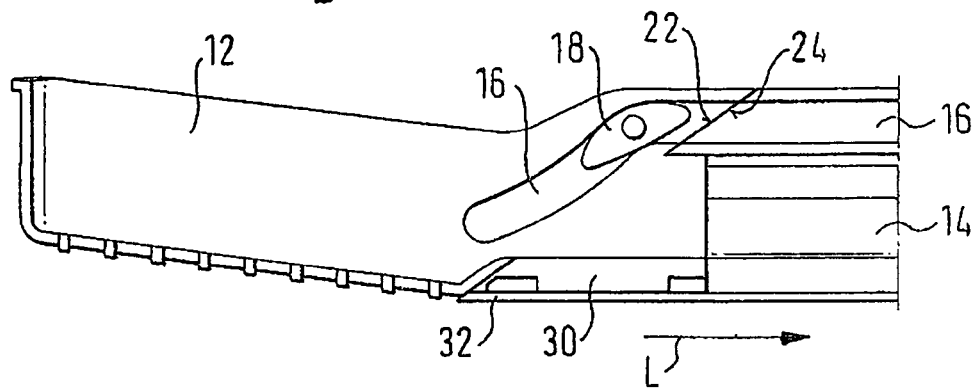
FIG. 6a shows a first sectional view of the guide rail according to the invention with a sliding element guided in a guide track.
FIG. 6b shows a second sectional view of the guide rail according to the invention with a sliding element guided in a guide track.
FIG. 6c shows a third sectional view of the guide rail according to the invention with a sliding element guided in a guide track.
FIG. 6d shows a fourth sectional view of the guide rail according to the invention with a sliding element guided in a guide track.
Figure 6:
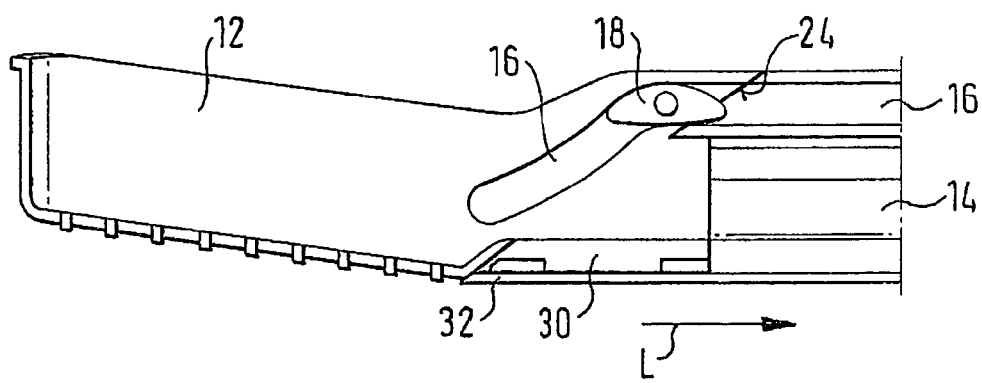
Figure 6:
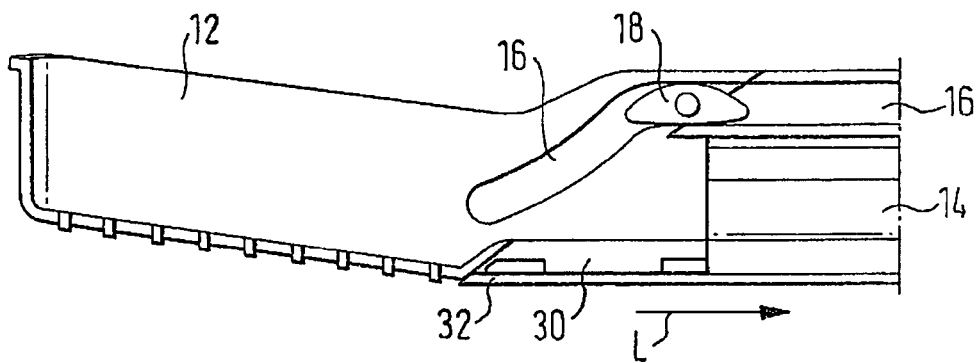
Figure 6:
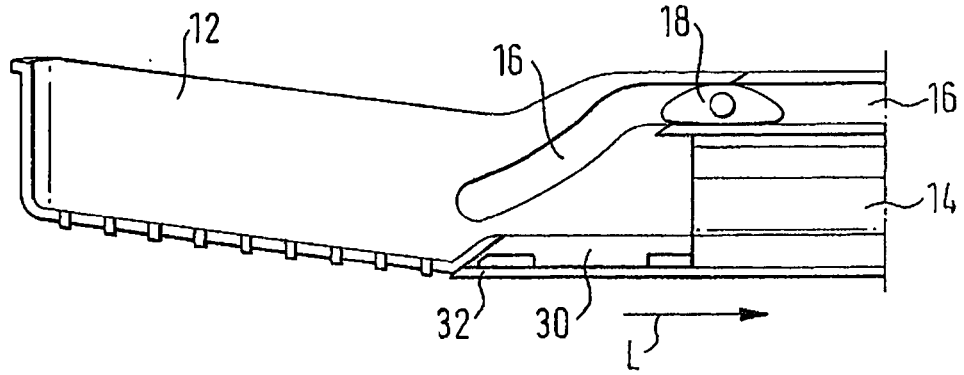

The guide rail 10 has a first rail element 12 that is shown as a plug-in element having two parts made of plastic. When the guide rail 10 is in an assembled state, the first rail element 12 is rigidly connected with a second rail element 14 (see FIGS. 4 to 6) comprising a substantially U-shaped profile rail of aluminum. The guide rail 10 has a guide track 16 that extends without interruption over the first and the second rail elements 12, 14, and in which a sliding element 18 of a sliding carriage 20, which is connected with the cover piece 6, may be guided.

The first rail element 12 and the second rail element 14 are arranged one behind the other in a longitudinal direction L of the guide rail 10, which in a mounted state corresponds substantially to a longitudinal direction of the vehicle. The first rail element 12 is situated in front of the second rail element 14, i.e. the first rail element 12 is further to the front on the vehicle 1.

Figure 4:
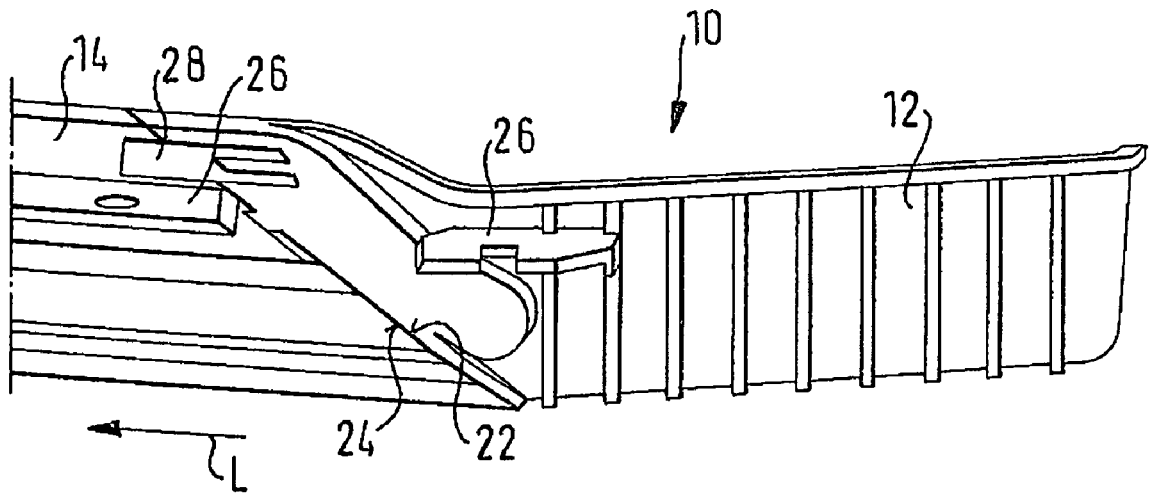
FIG. 4 shows a side view of the guide rail of FIG. 3.

As can be seen in particular from FIGS. 3 and 4, both the first and the second rail elements 12, 14 have an abutment edge 22 and respectively 24 facing the other respective rail element. The abutment edges 22, 24 run in a straight line and form an acute angle of approximately 35 degrees with the longitudinal direction L of the guide rail 10. The two abutment edges 22, 24 are formed to be complementary to each other, which means that in an assembled state of the first and second rail elements 12, 14 a gap-free transition is produced between the first and second rail elements 12, 14 (see FIGS. 4 and 6).

The guide track 16 runs continuously in a straight line and parallel to the longitudinal direction L of the guide rail 10 over the entire second rail element 14, for which reason the second rail element 14 can be produced in a particularly simple manner by extrusion. In a region of the first rail element 12, the guide track 16 initially has a section extending obliquely upwards, which then continues into a section running parallel to the longitudinal direction L before the transition to the second rail element 14.

Both the first and second rail elements 12, 14 have laterally arranged formed-on pieces 26, which serve for mounting of the guide rail 10 on the vehicle roof 2. Projections 28, which in the connected state (FIG. 4) come to lie against sides of the second rail element 14, are additionally provided on both sides on the first rail element 12 for a stable connection of the first rail element 12 with the second rail element 14. The first rail element 12 also has a contact surface 30 running in the longitudinal direction L of the guide rail 10. The first rail element 12 rests against a base 32 of the second rail element 14 at the contact surface 30.

FIGS. 6a to d show the guide rail 10 with a sliding element 18, guided in the guide track 16, in various positions as the positions are assumed in succession during opening of the cover piece 6. By the development of the guide rail 10 with abutment edges 22, 24, which run obliquely in accordance with the invention, it is ensured here that transition points from the first 12 to the second 14 rail element do not extend in a plane perpendicular to the guide track 16. In this way, the transition of the sliding element 18 from the first rail element 12 to the second rail element 14 does not take place abruptly, but rather gradually and continuously, which leads to less wearing of the sliding element 18 and a reduced noise development.

A further advantage of the development according to the invention is that through the oblique course of the abutment edge 24 of the second rail element 14, the first rail element 12 can rest with the contact surface 30 having a large area against the base 32 of the second rail element 14. This contributes to a particularly stable development of the guide rail 10. In particular, the first rail element 12 is guided longer in the second rail element 14 in the region of the base 32 then would be the case with a straight cut of the second rail element 14, as known from the prior art. The transition points from the first 12 to the second 14 rail element in the region of the guide track 16 are also supported by chamfering of the abutment edges 22, 24 and are therefore very stable in construction.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A guide rail for a sliding roof system in a motor vehicle, comprising:
    a first rail element;
    a second rail element rigidly connected with the first rail element; and
    at least one guide track that extends without interruption over the first and the second rail elements, the at least one guide track guiding a sliding element of a sliding carriage,
    and wherein one of the first and the second rail elements has an abutment edge facing an abutment edge of the other of the first and the second rail elements in a region of connection, and wherein the abutment edges extend obliquely to a longitudinal direction of the guide rail at least in a region of the at least one guide track, the abutment edges being formed to be complementary to each other, and wherein the abutment edges define corresponding abutting contact surfaces that extend at an oblique angle relative to the longitudinal direction of the guide rail, and wherein the corresponding abutting contact surfaces extend obliquely in a generally straight line from an upper surface of the guide rail to a lower surface of the guide rail.

2. The guide rail according to claim 1 wherein the abutment edges run in a generally straight line and form an acute angle with the longitudinal direction of the guide rail.

3. The guide rail according to claim 1 wherein the first rail element comprises a material that is different from a material of the second rail element.

4. The guide rail according to claim 1 wherein the second rail element is a profile rail made of metal.

5. The guide rail according to claim 1 wherein the first rail element is a plug-in element made of plastic.

6. The guide rail according to claim 1 wherein the at least one guide track has a section extending obliquely upwards in a region of the first rail element, and running continuously in a straight line parallel to the longitudinal direction of the guide rail in a region of the second rail element.

7. The guide rail according to claim 1 wherein the first rail element has a contact surface running substantially in the longitudinal direction of the guide rail, the first rail element resting against the second rail element at the contact surface.

8. The guide rail according to claim 1 wherein the sliding element of the sliding carriage includes structure for connection to a cover piece.

9. The guide rail according to claim 1 wherein the abutment edges deviate from a line perpendicular to the longitudinal direction of the guide rail.

10. The guide rail according to claim 1 wherein the first rail element includes a first guide track portion and the second rail element includes a second guide track portion, and wherein the first rail element includes a plug-in element that is mounted onto the second rail element to align the first and the second guide track portions to provide a single guide track that extends uninterrupted along the first and the second rail elements.

11. The guide rail according to claim 10 wherein the first rail element is comprised of a first material and the second rail element is comprised of a second material different than the first material.

12. The guide rail according to claim 11 wherein the first material comprises a plastic material and the second material comprises a metal material.

13. The guide rail according to claim 11 wherein the first and the second rail elements comprise a guide rail that defines a longitudinal axis, and including a sliding carriage adapted for connection with at least one movable cover, the sliding carriage including a sliding element that is received within the single guide track such that the at least one movable cover can be moved along the guide rail.

14. The guide rail according to claim 13 wherein the first guide track portion substantially extends obliquely relative to the longitudinal axis and the second guide track portion extends substantially parallel to the longitudinal axis.

15. The guide rail according to claim 1 including a sliding carriage adapted for connection with at least one movable cover, the sliding carriage including a sliding element that is received within the at least one guide track such that the at least one movable cover can be moved along the first and the second rail elements, and wherein the abutment edges remain in direct abutting contact with each other as the movable cover moves between open and closed positions.

16. The guide rail according to claim 1 wherein the abutment edges run in a generally straight line from an upper surface of the guide rail to a lower surface of the guide rail and form an oblique angle with the longitudinal direction of the guide rail.

17. The guide rail according to claim 16 wherein each abutment edge comprises a single planar surface.

18. The guide rail according to claim 1 wherein the at least one guide track includes a first transition interface between the first and second rail elements and a second transition interface between the first and second rail elements and wherein the sliding element contacts one of the first and second transition interfaces before contacting the other of the first and second transition interfaces.

* * * * *